Nov. 8, 1932.          A. B. MODINE          1,887,035
VEHICLE HEATER AND HEAT CONTROL DEVICE
Filed April 16, 1930       3 Sheets-Sheet 1

Witness:
William P. Kilroy

Inventor:
Arthur B. Modine
By Hill & Hill
Attys

Nov. 8, 1932.    A. B. MODINE    1,887,035
VEHICLE HEATER AND HEAT CONTROL DEVICE
Filed April 16, 1930    3 Sheets-Sheet 2
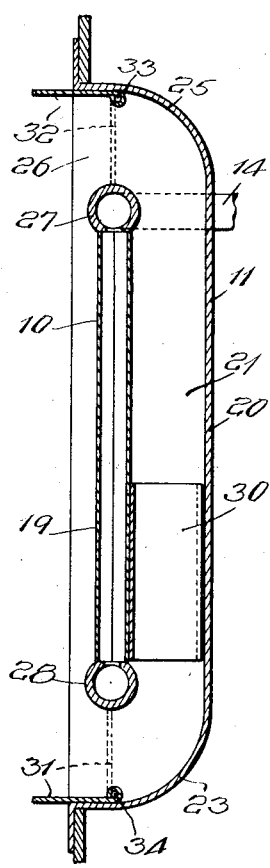
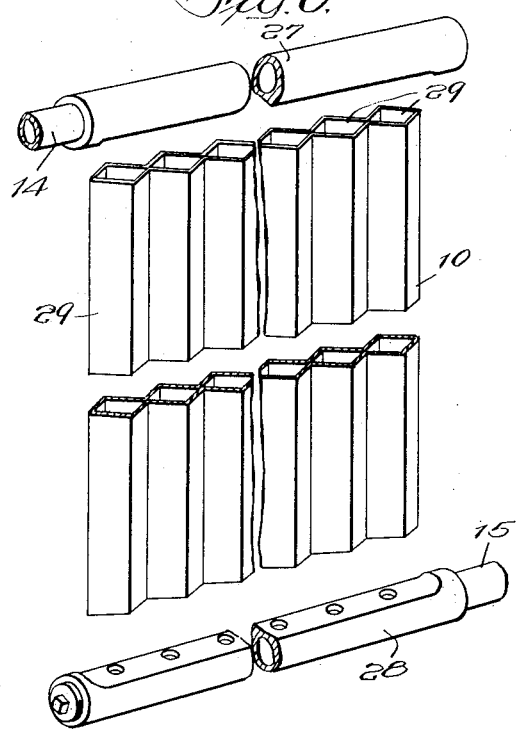
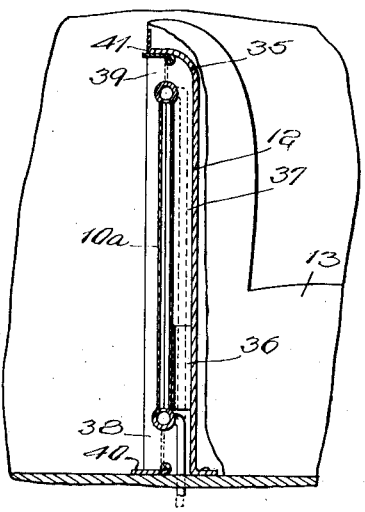
Witness:
William P. Kilroy
Inventor:
Arthur B. Modine
By Hill & Hill
Attys.

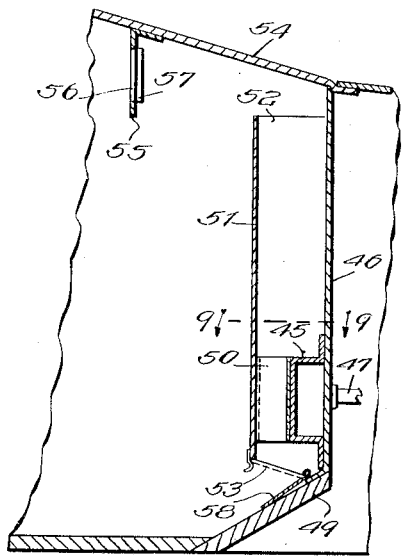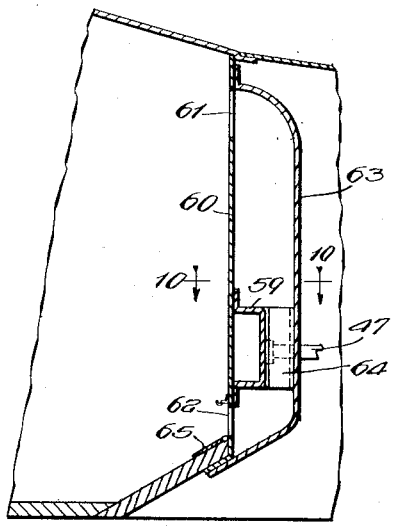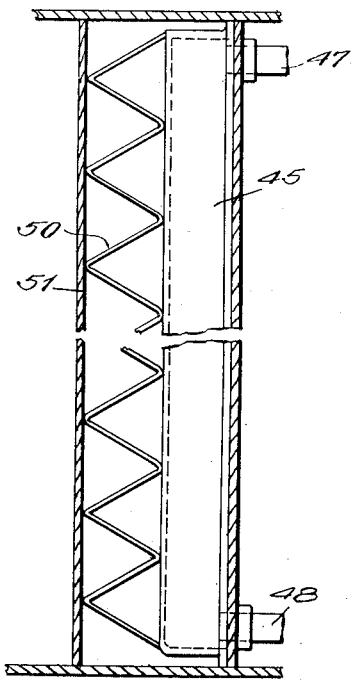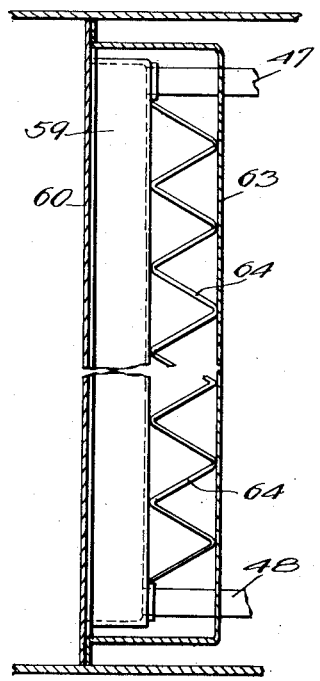

Patented Nov. 8, 1932

1,887,035

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

VEHICLE HEATER AND HEAT CONTROL DEVICE

Application filed April 16, 1930. Serial No. 444,698.

The invention relates to a device designed to maintain the interior of an automobile or other vehicle body at a desired temperature.

The invention has among its objects the provision of a construction including a heater element whereby relatively cool air contained within the vehicle body is caused to circulate into contact with the heater element which transfers heat to said air and discharges the heated air therefrom into the vehicle body.

It is a further object of the invention to provide a construction operable in the manner just referred to which is capable of heating air by both radiation and convection.

It is another principal object of the invention to provide a construction capable of functioning in the dual capacity of a heater and as a means for insulating the interior of the car against heat generated by the engine of an automobile to thereby provide heating means capable of use in relatively cool weather which may, when found desirable, provide means to assist in maintaining the vehicle body at a comfortable temperature during warm or hot weather.

It is another object of the invention to provide a construction capable of performing the above and other features, which may be connected with the cooling system for the motor of the vehicle to thus supply a heating medium to the heater element and to combine therewith means for preventing the flow of said medium from the engine to the heater to thereby render the heater ineffective when this is found necessary or desirable.

It is a further object of the invention to provide means for preventing circulation of air contained in the vehicle body in the manner above recited to thereby provide means for maintaining said air relatively cool when this is desired.

In addition to the above, it is an object to employ a wall of one of the elements of the vehicle body as an element of the means for heating and circulating the heated air and it is also an object to employ a wall of the body as an element of the means for insulating the vehicle body against the heat of the engine.

The invention has these and other objects, all of which will be more readily understood when read in conjunction with the accompanying drawings, it being obvious that changes and modifications may be resorted to without departing from the spirit of the appended claims forming a part hereof.

In the drawings, Fig. 1 is a view partially in section of the front end of an automobile showing the device in one position of use;

Fig. 4 is a section taken on line 4—4 of Fig. 2 showing a portion of the device illustrated in Fig. 1 at a slightly enlarged scale;

Fig. 5 illustrates the structure shown in Figs. 1 to 4 applied in the rear wall of the front seat of an automobile;

Fig. 6 is a perspective view showing a heat exchange device which may be employed to accomplish certain of the features above referred to;

Fig. 7 is a sectional view showing a dash board and a cowl of an automobile disclosing a means for heating the interior of the vehicle body through the agency of heated air;

Fig. 8 is a view similar to Fig. 7 showing a modified arrangement which may be employed;

Fig. 9 is a section taken on line 9—9 of Fig. 7; and

Fig. 10 is a section taken on line 10—10 of Fig. 8.

Figure 1:
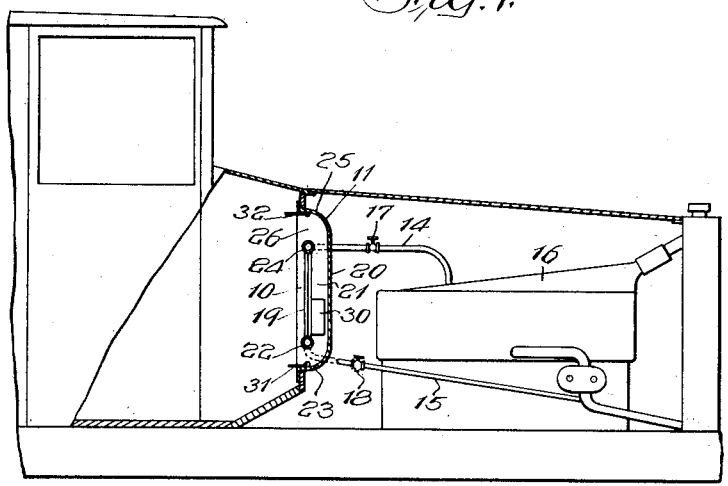

The invention contemplates locating a device generally designated 10 in either the dash board 11 of an automobile or other vehicle or the rear wall 12 of the front seat 13 thereof. In either instance, the heat exchange device 10 is provided with a heating fluid supply 14 and a return pipe 15. The supply and return pipes 14 and 15 are connected with the circulatory system for the cooling liquid for the motor or engine 16 and thus will supply the device generally designated 10 with a heating medium.

The supply and return pipes 14 and 15 are each provided with a valve respectively designated 17 and 18 so that circulation of the cooling medium for the engine may be prevented from flowing through the heat exchange device, should the temperature of the interior of the vehicle body be found sufficient for comfort without the aid of additional heat.

In the embodiment of the invention shown in Fig. 1, the dash board 11 is formed to provide a depression which forms a housing for the heat exchange device generally designated 10, it being understood that one face such as 19 of the heat exchange device 10 is exposed to the interior of the vehicle body so that it may supply heat by radiation to the air contained in the body. The heat exchange device 10 is arranged relatively to the wall 20 of the dash board so that a space 21 is provided between the heat exchange device 10 and the wall 20, and is further arranged within the depression so that the lower longitudinal edge 22 of the heat exchange device is located in spaced relation to the adjacent longitudinal edge 23 of the depression. The upper edge 24 of the heat exchange device is also located in spaced relation to the adjacent edge 25 of the depression and, therefore, a passage is provided at the lower end of the depression, through which the relatively cool air contained within the vehicle body may circulate into the passage 21, be heated by contact with the heat exchange device 10 and be discharged by convection through the opening 26 located adjacent the upper edge of the heat exchange device.

Figure 2:
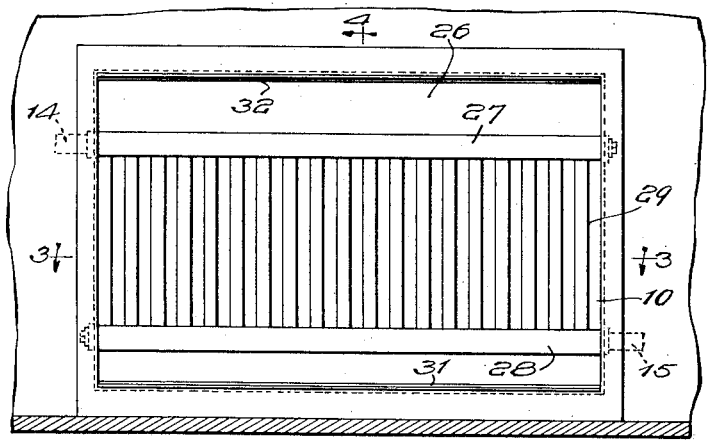
Fig. 2 is an elevation of the device shown in Fig. 1 looking toward the front of the vehicles.
Figure 3:
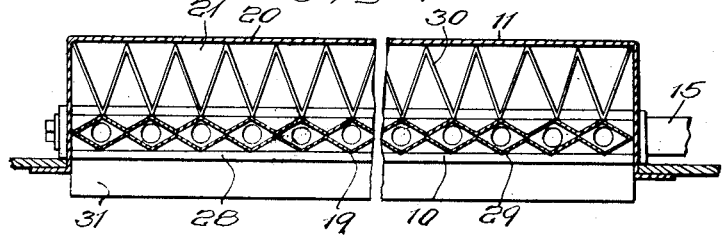
Fig. 3 is a section taken on line 3—3 of Fig. 2.

The invention contemplates the employment of a heat exchange device such as that most clearly shown in Fig. 2 which extends tranversely of the vehicle body and is comprised of headers 27 and 28 which are connected with each other through the medium of the transversely extending tubular passages 29, the latter being of relatively thin gauged material and formed in the manner shown in Fig. 6, it being understood that the supply and return pipes 14 and 15 are respectively connected with the headers 27 and 28 and thus cooling fluid circulating through the engine which is of a relatively high temperature is caused to circulate from the engine through the heat exchange device and back to the engine. The heat exchange device may have heat radiating fins 30 secured to one face thereof which are projected into the passage 21 and will thus facilitate heating and circulation of the air introduced to the passage.

By referring to Fig. 4, it will be noted that a means is provided for preventing the circulation of air through the passage 21. Any suitable means may be employed to accomplish this feature; however, that shown consists of shutters or dampers respectively designated 31 and 32 which are hinged at 33 and 34 so that they may be arranged to allow circulation of air through said passage 21 or be arranged as shown in dotted lines to prevent said circulation.

As before stated, the structure is capable of being employed to insulate the interior of the vehicle body against the heat emanating from and generated by the operation of the motor 16 of the vehicle. It is manifest that the shutters 31 and 32 may be closed and will thus prevent the circulation of air through the passage 21 which transforms the passage into a chamber confining air therein, which provides a dead air space, which will hinder the passage of heat. When the shutters 31 and 32 are arranged in the manner just referred to, the valves 17 and 18 are manipulated to prevent circulation of heating fluid through said device, and since circulation of the cooling medium for the engine through the heat exchange device is prevented, the heat exchange device 10 is transformed to provide additional means for insulating against the transfer of heat to the interior of the vehicle body emanating from the engine.

When the invention is applied to a structure such as that shown in Fig. 5, in other words, a wall of the front seat of the vehicle, the wall 12 of the front seat is formed to provide the depression 35 as referred to in the explanation of the construction of the dash board 11. The heat exchange device 10a of this structure may be provided with fins such as 36 and said heat exchange device 10a is arranged within the depression so as to provide an air passage 37, an air inlet 38 and an air outlet 39. It is understood that the structure illustrated in Fig. 5 may be connected with the circulatory system of the engine 16 in the manner described in the structure shown in Fig. 1 and may also be provided with valves such as 17 and 18 shown in Fig. 1 which are provided to prevent the circulation of the heating medium through the radiator or heat exchange device 10a. The structure shown in Fig. 5 is provided with dampers respectively designated 40 and 41 arranged in the inlet and outlet respectively designated 38 and 39 so that the amount of heat supplied to the vehicle body may be regulated.

The structures illustrated in Figs. 7 to 10, inclusive contemplate an arrangement which is capable of connection with any suitable portion of the engine such as the exhaust manifold or exhaust pipe to thereby form a means for heating air to heat the interior of the vehicle body.

The structure shown in Figs. 7 and 8 contemplates the provision of a channel-shaped element 45 which extends transversely of the automobile body and is suitably fastened to the dash board 46 to thereby form a hot air passage which is supplied with hot air by means of the inlet 47. The heated air circulates through the passage and is discharged through the outlet 48.

This channel-shaped element 45 may, in some instances, be a part of the vehicle frame and is preferably located near the foot board 49 and may be provided with heat radiating fins 50.

It will be noted that in the structure illustrated in Fig. 7, this channel-shaped element 45 projects inwardly or toward the interior of the vehicle body and is encased within a casing formed by the plate 51 which is formed to provide side and end walls of a passage which includes the dash board 46. The structure thus formed by the plate 51 and the dash board 46 is open at its upper end as indicated at 52 and is also open at its lower end as indicated at 53. It is manifest that this arrangement provides a means whereby the relatively cool air located at the bottom of the vehicle body may circulate through the casing formed by the member 51 and the dash board 46 and be discharged in a heated condition through the upper open end 52 and thence into the vehicle body. The cowl 54 may be provided with the downwardly projecting baffle wall 55 which is provided with a plurality of slotted openings 56 which may be controlled through the agency of a slidable shutter 57. This arrangement will deflect the heated air discharged from the open end 52 in a downward direction toward the feet of the driver of the vehicle and will also when the shutter is open, cause a portion of the heated air to be discharged toward the driver or person occupying the seat with the driver of the car.

The structure contemplates the utilization of a damper of any suitable character which will regulate and control the passage of air through the space provided between the wall 51 and the dash board 46. The damper employed in the present instance is indicated at 58 and is arranged to control the open end 53 of the device. It is manifest that this construction provides an efficient arrangement for heating the air contained in the interior of the vehicle body through the agency of heat emanating from the exhaust of an internal combustion engine. The structure shown in Fig. 8 substantially corresponds to that shown in Fig. 7, however, differs in that the channel-shaped member 59 forming part of a heat conveying conduit is located upon that side of the dash board 60 which is nearest the engine and the dash board 60 is provided with openings 61 and 62. The member 59 is encased between the dash 60 and an element 63 which, with the dash board, forms a casing within which said member 59 is arranged. The member 59 may, as previously described, be provided with heat radiating fins 64 and said member 59 is also provided with an inlet and outlet providing connections with some suitable portion of the exhaust manifold or exhaust pipe of the engine. This structure may also be provided with a damper 65 for controlling the passage of air through the space produced between the dash board 60 and the element 63 as described in connection with the structure illustrated in Fig. 7.

From the foregoing description of the invention, it is evident that a structure is provided which is capable of functioning in the dual capacity of a heater to supply heat to the interior of a vehicle body and also insulate the interior of the vehicle body against the transfer of heat generated by the engine 16 to thus assist in maintaining the interior of the vehicle body at a desired temperature during warm or hot weather. It is further evident that the construction provides means whereby circulation of the air contained in the vehicle body is produced through the agency of the relatively cool air contained in the lowermost portion of the body which is introduced to and is heated by the heater which causes the heated air to be discharged in a heated condition into the vehicle body.

Having thus described the invention, what I claim and desire to cover by Letters Patent is:

1. In a vehicle heater, the combination of a heat exchange device comprised of parallel walls and providing a chambered member and a wall providing an element of the body of said vehicle, one wall of said heat exchange device and said element of said body being arranged relatively to each other to provide a space between said element and said wall of said heat exchange device for the circulation of air, and said heat exchange device being supported within said space by said element and providing means for heating air by radiation and providing an element of means for circulating air through the space between said heat exchange device and element.

2. In an automobile heater, the combination of a heat exchange device comprised of parallel walls and providing a chambered member having means for connecting said device with the circulatory system for the cooling liquid for the engine of said automobile and a wall providing an element of the body of the vehicle, a wall of said heat exchange device and element being arranged relatively to each other to provide a space between said element and said wall of the heat exchange device for the circulation of air, and said heat exchange device being supported within said space by said element and providing means for heating air by radiation and providing an element of means for circulating air through the space between said heat exchange device and element.

3. In an automobile heater, the combination of a heat exchange device adapted for connection with the circulatory system for the cooling liquid for the engine of said automobile and a wall providing an element of the body of the vehicle, said heat exchange device and wall being arranged relatively to each other to provide a space between said wall and heat exchange device for the circulation of air, and said heat exchange device being supported by said element of said body and providing means for heating air by radiation and providing an element of means for circulating air through the space between said heat exchange device and wall, and means for preventing the circulation of said air through said space.

4. In a vehicle heater, the combination of a heat exchange device and a wall having a recess, the wall providing an element of the body of said vehicle, said heat exchange device and said wall being arranged relatively to each other to provide a space at opposed ends and at one side of said device for the circulation of air, and said heat exchange device being supported by said element of said body and providing means for heating air by radiation and providing an element of means for circulating air through the space between said heat exchange device and wall, and means for preventing the circulation of air through said space.

5. In an automobile heater, the combination of a heat exchange device adapted for connection with the circulatory system for the cooling liquid for the engine of said automobile and a member providing a wall, said heat exchange device and wall being arranged relatively to each other to provide a space between them for the circulation of air, said heat exchange device being supported by said wall and providing means for heating air by radiation and providing an element of means for circulating air through the space between said heat exchange device and wall, means for preventing the circulation of the cooling liquid through said heat exchange device, and means preventing the circulation of air through said space.

6. In a device of the character described, the combination of a member providing part of a circulatory system for a heating medium arranged adjacent the dash board of an automobile body, said member being arranged in spaced relation to and supported by said dash board, said member providing means for heating air by radiation, the space between said member and dash board providing means for heating and circulating air by convection, and means for preventing circulation and providing means for insulating the interior of the automobile body against the heat generated by the motor of said automobile.

7. In an automobile heater, the combination of a heat exchange device adapted for connection with the circulatory system for the cooling liquid of the engine of said automobile, means for controlling circulation of said liquid, said heat exchange device being arranged in spaced relation to and supported by the dash board of the body of the automobile and said device being arranged relatively to the dash board to provide a passage between said dash board and heat exchange device for the circulation of air through said passage, means for controlling the circulation of air through said passage to thereby provide means for controlling heating of the interior of the automobile body, said heating device and space being adapted to provide means for insulating the interior of said body against the transfer of heat generated by the engine of the vehicle.

8. In a device of the kind described, the combination of a vehicle body and a heat exchange device having a heating fluid inlet and outlet, said device being extended transversely across the interior of the vehicle body with a longitudinal edge thereof in spaced relation to the floor of the body, said heat exchange device being supported by and being spaced from a wall of said body to provide a space for circulation of air between said heating device and wall, and means for preventing the circulation of said heating fluid through said heater device and the passage of air through the space provided between the heating device and wall.

9. In a device of the kind described, the combination of a vehicle body and a heat exchange device having a heating fluid inlet and outlet, said device being located within and extended transversely of the length of a vehicle body and having one edge thereof arranged in spaced relation to the floor of the vehicle body, said device being spaced from and supported by a wall of the body to provide a wall of a passage located between said device and said wall of said body which passage communicates with the space provided at said edge and floor and communicates at its opposite edge with the interior of said vehicle body to thereby provide means for causing circulation of air through said passage and into said vehicle body.

10. In a device providing means for heating the interior of the body of a vehicle, said device having means adapted for connection with the cooling fluid passage of an internal combustion engine, said device being also adapted to provide a wall of a space providing means for insulating the interior of a vehicle body against the transfer of heat generated by the engine.

11. In a device of the kind described, the combination of a vehicle body and a heat exchange device having a fluid inlet and a fluid outlet, said device being arranged transversely of the interior of the vehicle body with a longitudinal edge thereof in spaced relation to the floor of the body, said body having spaced walls, said heat exchange device being supported by a wall and being spaced from a wall of said body, and providing means engaging air circulating through the space between said walls.

12. In a device of the kind described, the combination of a vehicle body and a heat exchange device having a fluid inlet and a fluid outlet, said device being arranged transversely of the interior of the vehicle body with a longitudinal edge thereof in spaced relation to the floor of the body, said body having spaced walls, said heat exchange device being supported by a wall and being spaced from a wall of said body and providing means engaging air circulating through the space between said walls, and heat radiating fins extending from said heat exchange device into said space between said walls.

In witness whereof, I hereunto subscribe my name this 27th day of March A. D., 1930.

ARTHUR B. MODINE.